United States Patent [19]

Curran

[11] 4,269,600
[45] May 26, 1981

[54] DRAW TRANSMISSION

[76] Inventor: Thomas F. Curran, 460 N. Main St., Wauconda, Ill. 60084

[21] Appl. No.: 36,409

[22] Filed: May 7, 1979

[51] Int. Cl.³ .................... F16H 9/00; F16H 11/00
[52] U.S. Cl. .................................. 474/69; 74/190
[58] Field of Search .............. 74/190, 217 R, 242.1 R, 74/242.1 A, 242.8, 242.11 R, 242.11 C, 242.11 P, 242.11 A, 242.14 R; 474/69, 75, 900

[56] References Cited

U.S. PATENT DOCUMENTS

| | | | |
|---|---|---|---|
| 1,292,995 | 2/1919 | Beach | 474/69 |
| 1,803,186 | 4/1931 | Hendrickson | 74/242.1 A |
| 2,270,485 | 1/1942 | Waters | 74/217 R |
| 3,316,415 | 4/1967 | Taylor | 290/1 |
| 3,413,866 | 12/1968 | Ford | 74/242.11 R |
| 3,888,217 | 6/1975 | Hisserich | 474/900 |
| 4,075,901 | 2/1978 | Freyermuth | 74/190 |

FOREIGN PATENT DOCUMENTS 465370 9/1928 Fed. Rep. of Germany .... 74/242.11 R

*Primary Examiner*—Lawrence J. Staab
*Attorney, Agent, or Firm*—George H. Gerstman

[57] ABSTRACT

A transmission system is provided for differential speed control. An endless, resilient member in the form of an endless belt is driven by an input pulley. The speed differential is derived by using the input speed taken from one effective radius of the resilient element and picking the output speed from a different effective radius of the resilient element, with the different effective radii being variably selectable. Thus an output pulley has its periphery in contact with the resilient member and a control carriage coupled to the resilient member is operative to vary the curvature of the resilient member with respect to the periphery of the output pulley. In this manner, the neutral axis of the resilient member is varied to control the speed of the surface of the resilient member that is contacting the periphery of the output pulley.

14 Claims, 1 Drawing Figure

U.S. Patent     May 26, 1981     4,269,600
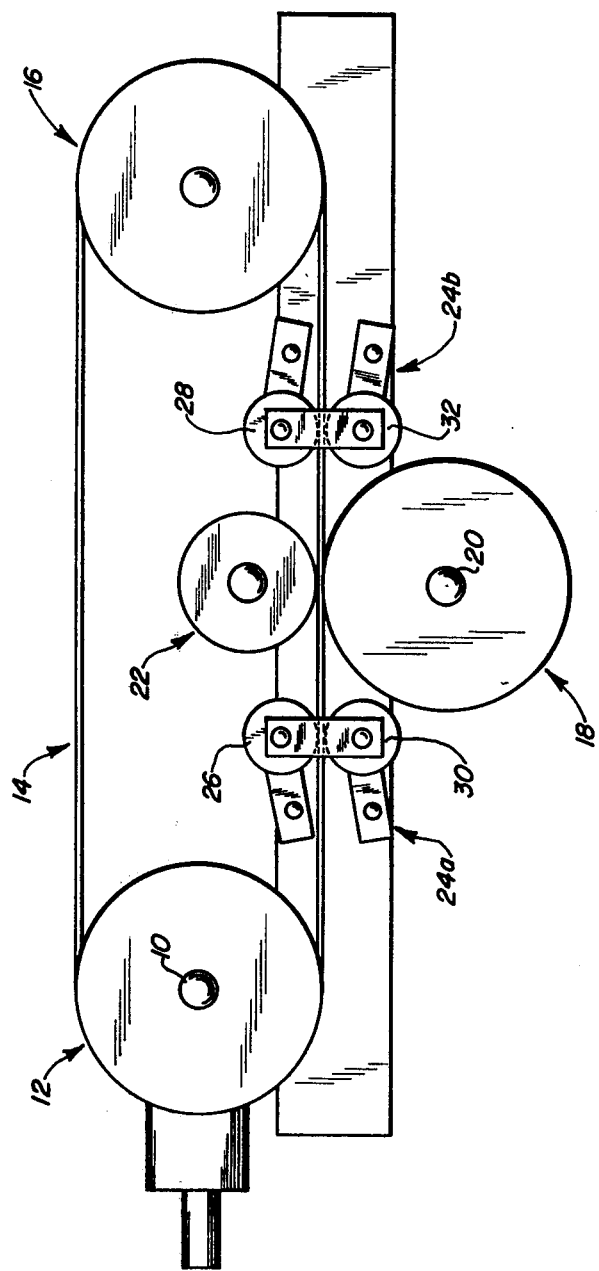

DRAW TRANSMISSION

BACKGROUND OF THE INVENTION

The present invention concerns a novel transmission system for differential speed control and, more particularly, a narrow range draw transmission that is suitable for servo control of rotating mechanisms requiring differential speed control up to the 10 percent range.

Differential control of draw percentage is required during the processing of continuous strands or webs of a generally elastic substrate. Such differential control is utilized in the areas of the process line where it is essential to maintain tension or to attain and maintain a constant length, such as in the drawing, printing, coating or perforating of a paper substrate. In closed loop applications, the substrate is monitored at various points throughout the process line and the differential draw is adjusted to compensate for changes in elasticity.

In the prior art, variable draw was obtained by either (a) using a wide range device over a small portion of its total range capability, or (b) using a wide range device in conjunction with a mechanical differential transmission.

Wide-range devices which were used over a small portion of their total range capability included variable pitch "V" pulleys in conjunction with standard or specially formed "V" belts, variable pitch toothed pulleys used in conjunction with a special "profile conforming" chain, friction drives using balls or cones or discs, variable voltage DC drives, variable frequency AC drives, etc. Generally, these wide-range devices have a control range between 4:1 and 20:1. This creates extensive range capability problems when the device is used as the output of a narrow band servo system. Many of these devices are subject to localized wear seriously limiting their useful life when they are continuously used over a narrow portion of their normal range.

As stated above, variable draw was also obtained in the prior art by utilizing the above devices in conjunction with a mechanical differential transmission. This could be an epicyclic gear arrangement, a harmonic drive set, a bevel or spur gear differential, or other related arrangements. While this approach reduces the total range of the device, it does not appreciably reduce wear grooving. Further, adding the mechanical differential system increases expense and adds to the complexity of the total machine.

SUMMARY OF THE INVENTION

In accordance with the present invention, a transmission system is provided for differential speed control. The system comprises input means connected to a driven input pulley and an endless resilient member driven by the input pulley. A tensioning pulley is spaced from the input pulley for providing tension for the endless resilient member.

In accordance with the present invention, output means are connected to an output pulley. The output pulley is an idler pulley located intermediate the driven pulley and the tensioning pulley, with the output pulley having its periphery in contact with the resilient member.

Means are provided for controlling the speed of the output pulley. The controlling means are coupled to the resilient member and are operative to vary the curvature of the resilient member with respect to the periphery of the output pulley. In this manner, the neutral axis of the resilient member will be varied to control the speed of the surface of the resilient member that is in contact with the periphery of the output pulley.

In the illustrative embodiment, the controlling means comprises a control carriage having four pulleys. Means are provided for moving the control carriage toward and away from the output pulley to vary the curvature of the resilient member with respect to the periphery of the output pulley. A nip pulley is positioned adjacent the output pulley but on the opposite side of the resilient member. The periphery of the nip pulley contacts the surface of the resilient member that is opposite to the surface of the resilient member in contact with the periphery of the output pulley.

A more detailed explanation of the invention is provided in the following description and claims, and is illustrated in the accompanying drawing.

BRIEF DESCRIPTION OF THE DRAWING

The drawing is a diagrammatic view of a transmission system constructed in accordance with the principles of the present invention.

DETAILED DESCRIPTION OF THE ILLUSTRATIVE EMBODIMENT

Referring to the drawing, the transmission system shown therein is useful for differential speed control, particularly in the range from 0 to 10 percent. An input shaft 10 is keyed to an input pulley 12, with input shaft 10 being driven at a predetermined speed so that input pulley 12 will operate as a drive pulley having such predetermined speed. Input pulley 12 drives an endless resilient member 14 which comprises a conventional endless belt preferably constructed with rubber-covered cords and/or other suitable resilient materials.

A tensioning pulley 16 in the form of an idler pulley also supports endless belt 14 and is mounted to provide a variable center distance between the two pulleys. Tensioning pulley 16 is suitably loaded so as to provide a predetermined belt tension. In the illustrative embodiment, tensioning pulley 16 has an equal diameter to the diameter of input pulley 12.

An output pulley 18 having an output shaft 20 keyed thereto comprises an output pulley and is located intermediate the driven input pulley 12 and the idler pulley 16. It is preferred that output pulley 18 be located at a point that is approximately equidistance between pulleys 12 and 16. In the illustrative embodiment, output pulley 18 has a diameter that is equal to the diameters of pulleys 12 and 16. It can be seen from the drawing that the inside of belt 14 contacts the peripheries of pulleys 12 and 16 while the outside of belt 14 contacts the periphery of pulley 18.

A nip pulley 22, having a diameter that is smaller than the diameter of pulleys 12, 18 and 16, is mounted directly opposite to pulley 18 with its periphery in contact with the inside of belt 14. Pulley 22 is suitably loaded so as to provide an essentially no-slip nip point between pulley 22, the belt 14 and output pulley 18.

In accordance with the invention, the speed of output pulley 18 and thus output shaft 20 is controlled by varying the curvature of belt 14 with respect to the periphery of output pulley 18. In this manner, the neutral axis of belt 14 will be varied to control the speed of the outside surface of belt 14 which is in contact with the periphery of the output pulley 18.

The speed control means of the present invention includes a control carriage 24a, 24b having a first pulley 26, a second pulley 28, a third pulley 30 and a fourth pulley 32. It can be seen that first pulley 26 is smaller in diameter than nip pulley 22 and is located intermediate output pulley 18 and input pulley 12 with the periphery of first pulley 26 being in contact with the inside surface of belt 14. Second, third and fourth pulleys 28, 30 and 32 have equal diameters to the diameter of pulley 26. Second pulley 28 is located between output pulley 18 and tensioning pulley 16 with its periphery being in contact with the inside surface of belt 14. Third pulley 30 is located between output pulley 18 and input pulley 12 with its periphery being in contact with the outside of belt 14. Fourth pulley 32 is located between output pulley 18 and tensioning pulley 16, with its periphery being in contact with the outside surface of belt 14. Pulleys 26, 28, 30 and 32 are mounted on fixed centers and turn freely on their internal bearings.

Pulleys 26, 28, 30 and 32 are connected to move selectively toward and away from the output pulley 18 in synchronism. Each pulley 26, 28, 30 and 32 has a shaft which terminates at the free end of a four-bar link arrangement and the shafts are tied together with a connector link. A force bias spring is provided to offset the force of the belt pull as the control pulleys are moved out of their center or neutral point. Thus the control carriage 24a, 24b is moved upward, away from output pulley 18 if the speed of output pulley 18 is to be increased with respect to the speed of input pulley 12. If the speed of output pulley 18 is to be decreased so that it becomes more equal to the speed of input pulley 12, control carriage 24a, 24b is lowered.

To understand the operation of the system, it can be seen that rotating input shaft 10 will rotate input pulley 12 causing belt 14 and all of the other pulleys 16, 18, 22, 26, 28, 30 and 32 to turn. Since input pulley 12 is wrapped by belt 14, input pulley 12 will impart its driving force to the inside surface of belt 14. However, the belt 14 leaving the input pulley 12 will have an outside surface speed that is greater than the speed of the periphery of the input pulley 12 due to the shift of the neutral axis of belt 14 as the input pulley 12 is unwrapped by belt 14.

As belt 14 passes through the nip point between nip pulley 22 and output pulley 18, these pulleys will turn. Since the belt 14 is in a straight line at this point, it will drive output pulley 18 at the outside surface speed of the belt as it left input pulley 12. If input pulley 12 and output pulley 18 are the same diameter, output shaft 20 will rotate faster than input shaft 10, because the outside surface of belt 14 in contact with output pulley 18 is moving faster than the inside surface of belt 14 in contact with pulley 12.

If the control carriage 24a, 24b is moved downwardly, the outside surface of belt 14 will begin to wrap output pulley 18 and thus change the neutral axis of belt 14. This change will be in a direction corresponding to the neutral axis of belt 14 as it passes around input pulley 12. The greater the amount of wrap of belt 14 on output pulley 18, the closer the speed of the input shaft 10 and output shaft 20 will coincide because the speed of the outside surface of belt 14 will decrease as it forms an arc around the periphery of output pulley 18. Since the speed of output pulley 18 will correspond to the speed of the outside of belt 14, it can readily be seen that wrapping the output pulley 18 with belt 14 will decrease the speed of output pulley 18.

Conversely, if control carriage 24a, 24b is raised so as to wrap nip pulley 22, the speed of the outside surface of belt 14 at the nip point between nip pulley 22 and output pulley 18 will increase. As the wrap of the belt 14 on pulley 22 is increased, the speed of the outside surface of belt 14 is increased at the nip point. Since output pulley 18 rotates in accordance with the speed of the outside surface of belt 14 at the nip point, it can be seen that moving the control carriage 24a, 24b away from the output pulley 18 will increase the speed of output pulley 18 and thus increase the speed of the output shaft 20.

Within limits, the ultimate range of the system can be controlled by selecting belt thickness and the relationship between the diameters of the pulleys. The useful range of any selected combination of diameters and thicknesses can be limited by controlling the excursion of the control carriage 24a, 24b.

While in the illustrative embodiment the output pulley 18 has been shown on the outside of the belt, the output pulley could be on the inside of the belt in the position of pulley 22 and the nip pulley could be on the outside of the belt in the position of pulley 18. Although an illustrative embodiment of the invention has been shown and described, it is to be understood that various modifications and substitutions may be made by those skilled in the art without departing from the novel spirit and scope of the present invention.

What is claimed is:

1. A transmission system for differential speed control, which comprises:
   input means connected to a driven input pulley;
   an endless resilient member coupled to said driven input pulley and driven by said input pulley;
   tensioning means spaced from said input pulley for providing tension for said endless resilient member;
   output means connected to an input pulley, said output pulley being an idler pulley located intermediate said driven pulley and said tensioning means and with its periphery in contact with said resilient member;
   said output pulley being spaced along the length of the resilient member from said input pulley; and
   means for controlling the speed of said output pulley, said controlling means being coupled to said resilient member and being operative to vary the curvature of said resilient member with respect to the periphery of said output pulley while not substantially varying the curvature of said resilient member with respect to the periphery of said input pulley, whereby the neutral axis of said resilient member will be varied to control the speed of the surface of the resilient member that is contacting the periphery of said output pulley while the neutral axis of the resilient member around said input pulley remains substantially constant.

2. A transmission system as described in claim 1, said input means comprising a shaft keyed to said driven input pulley.

3. A transmission system as described in claim 1, said resilient member comprising an endless belt.

4. A transmission system as described in claim 1, said tensioning pulley comprising an idler pulley mounted to provide a variable center distance between said input pulley and said tensioning pulley.

5. A transmission system as described in claim 1, said output means comprising a shaft keyed to said output pulley.

6. A transmission system as described in claim 1, said controlling means comprising a controlled carriage having a first pulley located intermediate said output pulley and said input pulley and a second pulley located intermediate said output pulley and said tensioning pulley, said first and second pulley being positioned on the side of said resilient member that is opposite to the output pulley side of said resilient member and with the peripheries of the first and second pulleys being in contact with the surface of the resilient member that is opposite to the surface of the resilient member in contact with the periphery of said output pulley, and means for moving said control carriage toward and away from said output pulley to vary the curvature of the resilient member with respect to the periphery of said output pulley.

7. A transmission system as described in claim 6, said control carriage further including a third pulley located adjacent said first pulley but on the output pulley side of the resilient member and a fourth pulley located adjacent said second pulley but on the output pulley side of the resilient member, said first and third pulleys and said second and fourth pulleys being connected to move selectively toward and away from said output pulley in synchronism.

8. A transmission system as described in claim 1, said output pulley being located outside of the endless resilient member.

9. A transmission system as described in claim 1, including a nip pulley positioned adjacent said output pulley but on the opposite side of the resilient member, with the periphery of the nip pulley contacting the surface of the resilient member opposite to the surface of the resilient member that is contacting the periphery of said output pulley.

10. A transmission system as described in claim 9, said controlling means comprising a control carriage having a first pulley located intermediate said output pulley and said input pulley, and a second pulley located intermediate said output pulley and said tensioning pulley; said first and second pulleys being positioned on the side of said resilient member that is opposite to the output pulley side of said resilient member and with the peripheries of the first and second pulleys being in contact with the surface of the resilient member that is opposite to the surface of the resilient member in contact with the periphery of said output pulley; said control carriage further including a third pulley located adjacent said first pulley but on the output pulley side of the resilient member and a fourth pulley located adjacent said second pulley but on the output pulley side of the resilient member; and means for moving said control carriage toward and away from said output pulley to vary the curvature of the resilient member with respect to the periphery of said output pulley, said first and third pulleys and said second and fourth pulleys being connected to move selectively toward and away from said output pulley in synchronism.

11. A transmission system for differential speed control, which comprises:
 an input shaft keyed to a driven input pulley;
 an endless belt coupled to said driven input pulley and driven by said input pulley;
 a tensioning pulley comprising an idler pulley spaced from said input pulley for providing tension for said endless resilient member, said tensioning pulley being mounted to provide a variable center distance between said input pulley and said tensioning pulley;
 an output shaft keyed to an output pulley, said output pulley being an idler pulley located intermediate said driven pulley and said tensioning pulley and with its periphery in contact with said resilient member, said output pulley being spaced along the length of the resilient member from said input pulley; and
 means for controlling the speed of said output pulley, said controlling means being coupled to said resilient member and being operative to vary the curvature of said resilient member with respect to the periphery of said output pulley while not substantially varying the curvature of said resilient member with respect to the periphery of said input pulley, whereby the neutral axis of said resilient member will be varied to control the speed of the surface of the resilient member that is contacting the periphery of said output pulley while the neutral axis of the resilient member around said input pulley remains substantially constant.

12. A transmission system as described in claim 11, including a nip pulley positioned adjacent said output pulley but on the opposite side of the resilient member, with the periphery of the nip pulley contacting the surface of the resilient member opposite to the surface of the resilient member that is contacting the periphery of said output pulley.

13. A transmission system as described in claim 12, said controlling means comprising a control carriage having a first pulley located intermediate said output pulley and said input pulley, and a second pulley located intermediate said output pulley and said tensioning pulley, said first and second pulleys being positioned on the side of said resilient member that is opposite to the output pulley side of said resilient member and with the peripheries of the first and second pulleys being in contact with the surface of the resilient member that is oppposite to the surface of the resilient member in contact with the periphery of said output pulley, said control carriage further including a third pulley located adjacent said first pulley but on the output pulley side of the resilient member and a fourth pulley located adjacent said second pulley but on the output pulley side of the resilient member; and means for moving said control carriage toward and away from said output pulley to vary the curvature of the resilient member with respect to the periphery of said output pulley, said first and third pulleys and said second and fourth pulleys being connected to move selectively toward and away from said output pulley in synchronism.

14. A transmission system as described in claim 1, wherein said intermediate position of said idler pulley with respect to said driven pulley and said tensioning means is equidistant said driven pulley and said tensioning means.

* * * * *